United States Patent
Chao et al.

(10) Patent No.: US 10,499,019 B2
(45) Date of Patent: Dec. 3, 2019

(54) MOTION DETECTION DEVICE AND MOTION DETECTION METHOD THEREOF

(71) Applicant: PRIMESENSOR TECHNOLOGY INC., Hsinchu County (TW)

(72) Inventors: Hsueh-Te Chao, Hsinchu County (TW); Wen-Han Yao, Hsinchu County (TW)

(73) Assignee: PRIMESENSOR TECHNOLOGY INC., Hsinchu County (TW)

( * ) Notice: Subject to any disclaimer, the term of this patent is extended or adjusted under 35 U.S.C. 154(b) by 104 days.

(21) Appl. No.: 15/854,697

(22) Filed: Dec. 26, 2017

(65) Prior Publication Data

US 2019/0199976 A1    Jun. 27, 2019

(51) Int. Cl.
| | |
|---|---|
| *H04N 7/18* | (2006.01) |
| *G01J 5/10* | (2006.01) |
| *G01J 5/00* | (2006.01) |
| *H04N 5/232* | (2006.01) |
| *G01J 5/02* | (2006.01) |

(52) U.S. Cl.
CPC ............ *H04N 7/188* (2013.01); *G01J 5/0025* (2013.01); *G01J 5/025* (2013.01); *G01J 5/026* (2013.01); *G01J 5/10* (2013.01); *H04N 5/23245* (2013.01); *H04N 7/185* (2013.01); *G01J 2005/0077* (2013.01)

(58) Field of Classification Search
None
See application file for complete search history.

(56) References Cited

U.S. PATENT DOCUMENTS

| | | | |
|---|---|---|---|
| 6,388,773 B1 | 5/2002 | Smith | |
| 7,634,662 B2 | 12/2009 | Monroe | |
| 2015/0305114 A1 | 10/2015 | Hack | |
| 2016/0104510 A1* | 4/2016 | Tamir | H04N 5/222 386/223 |
| 2016/0110973 A1 | 4/2016 | Cho | |
| 2016/0277688 A1* | 9/2016 | Gaskamp | H04N 5/332 |

* cited by examiner

*Primary Examiner* — Eileen M Adams
(74) *Attorney, Agent, or Firm* — Winston Hsu (57) ABSTRACT

A motion detection device is matched with a passive detector utilized to detect an object and to accordingly generate a triggering signal. The motion detection device includes an image capturing unit and an operating processor. The operating processor is electrically connected with the image capturing unit, the operating processor is adapted to switch the image capturing unit from a sleep mode to a wakeup mode for motion detection while being triggered by the triggering signal, and further to optionally actuate an external host in accordance with an analysis result of the motion detection. A motion detection method applied to the motion detection device includes receiving the triggering signal, switching the image capturing unit to the wakeup mode for capturing the first monitoring image, analyzing the first monitoring image to determine existence of the object, and actuating the external host in accordance with an analysis result of the first monitoring image.

22 Claims, 5 Drawing Sheets

MOTION DETECTION DEVICE AND MOTION DETECTION METHOD THEREOF

BACKGROUND OF THE INVENTION

1. Field of the Invention

The present invention relates to a motion detection device, and more particularly, to a motion detection device having capable of preventing false alarm of an infrared detector and having advantages of energy economy and immediate reaction.

2. Description of the Prior Art

Figure 5:
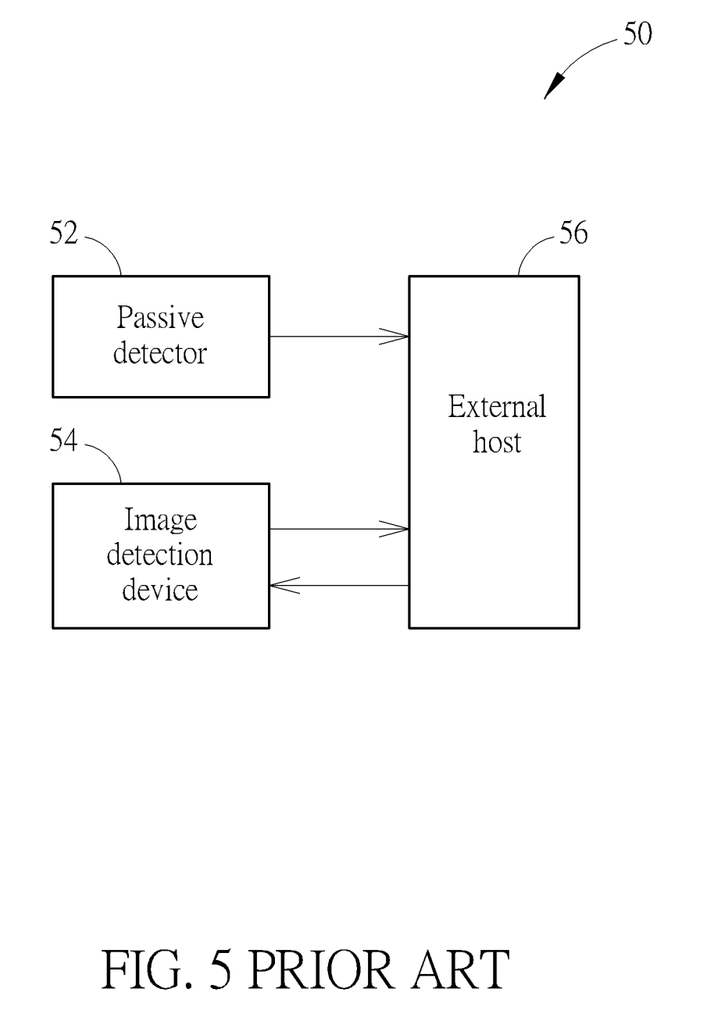
FIG. 5 is a monitoring system in prior art.

Please refer to FIG. 5. FIG. 5 is a monitoring system 50 in prior art. The monitoring system 50 includes a passive detector 52 and an image detection device 54 electrically connected to an external host 56. The passive detector 52 can transmit a triggering signal to the external host 56 while detecting temperature variation, the external host 56 wakes up by the triggering signal and then actuates the image detection device 54, and the image detection device 54 executes an exposure adjustment while being actuated and starts to capture a monitoring image or to record monitoring video. Thus, even though the passive detector 52 detects the temperature variation, the image detection device 54 captures the monitoring image at a later time in relation to a transmission period of the triggering signal, wakeup periods of the external host 56 and the image detection device 54, and an exposure adjustment period of the image detection device 54, so that the monitoring system 50 cannot record the monitoring video right after the passive detector 52 detects an unusual state.

SUMMARY OF THE INVENTION

The present invention provides a motion detection device having capable of preventing false alarm of an infrared detector and having advantages of energy economy and immediate reaction for solving above drawbacks.

According to the claimed invention, a motion detection device is matched with a passive detector utilized to detect an object and to accordingly generate a triggering signal. The motion detection device includes an image capturing unit and an operating processor. The operating processor is electrically connected with the image capturing unit, the operating processor is adapted to switch the image capturing unit from a sleep mode to a wakeup mode for motion detection while being triggered by the triggering signal, and further to optionally actuate an external host in accordance with an analysis result of the motion detection.

According to the claimed invention, a motion detection method is applied to the motion detection device matched with a passive detector utilized to detect an object and to accordingly generate a triggering signal. The motion detection method includes receiving the triggering signal, switching an image capturing unit from a sleep mode to a wakeup mode for capturing a first monitoring image with low quality via the triggering signal, analyzing the first monitoring image to determine existence of the object, and actuating an external host in accordance with an analysis result of the first monitoring image.

According to the claimed invention, a motion detection device is matched with a passive detector utilized to detect an object and to accordingly generate a triggering signal. The motion detection device includes an image capturing unit and an operating processor. The operating processor is electrically connected with the image capturing unit, the operating processor is adapted to switch the image capturing unit from a sleep mode to a wakeup mode for motion detection while being triggered by the triggering signal. The image capturing unit operates in a low frame rate to determine an exposure parameter of the image capturing unit but not stores monitoring images to a memory while in the sleep mode, and operates in a high frame rate to determine existence of the object and stores the monitoring images to the memory while in the wakeup mode.

According to the claimed invention, a motion detection device is matched with a passive detector utilized to detect an object and to accordingly generate a triggering signal. The motion detection device includes an image capturing unit and an operating processor. The operating processor is electrically connected with the image capturing unit, the operating processor is adapted to switch the image capturing unit from a sleep mode to a wakeup mode for motion detection while being triggered by the triggering signal. The image capturing unit captures and stores a plurality of monitoring images in a memory in the wakeup mode, and when the operating processor determines existence of the object through the stored monitoring images then the image capturing unit is switched to a recording mode to record monitoring video.

The motion detection device of the present invention is electrically connected between the passive detector and the external host, and the motion detection device is utilized to actuate the external host while the passive detector triggers the motion detection device switched from the sleep mode to the wakeup mode. As the motion detection device is in the sleep mode, the motion detection device can be awaken in the low frame rate to adjust the exposure parameter and to capture the background image; as the motion detection device is switched to the wakeup mode, the motion detection device is transformed into the high frame rate to capture the low quality monitoring image. The motion detection device executes the simple image analysis via the low quality monitoring image for a start for determining whether to actuate the external host; since the motion detection device actuates the external host, the motion detection device captures and stores the high quality monitoring image, and the high quality monitoring image can be used by the external host for the accurate image analysis and execution of related application programs. The motion detection device of the present invention can effectively economize start-up time of the monitoring system without waiting for a wakeup period of the external host and an exposure adjustment period of the motion detection device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
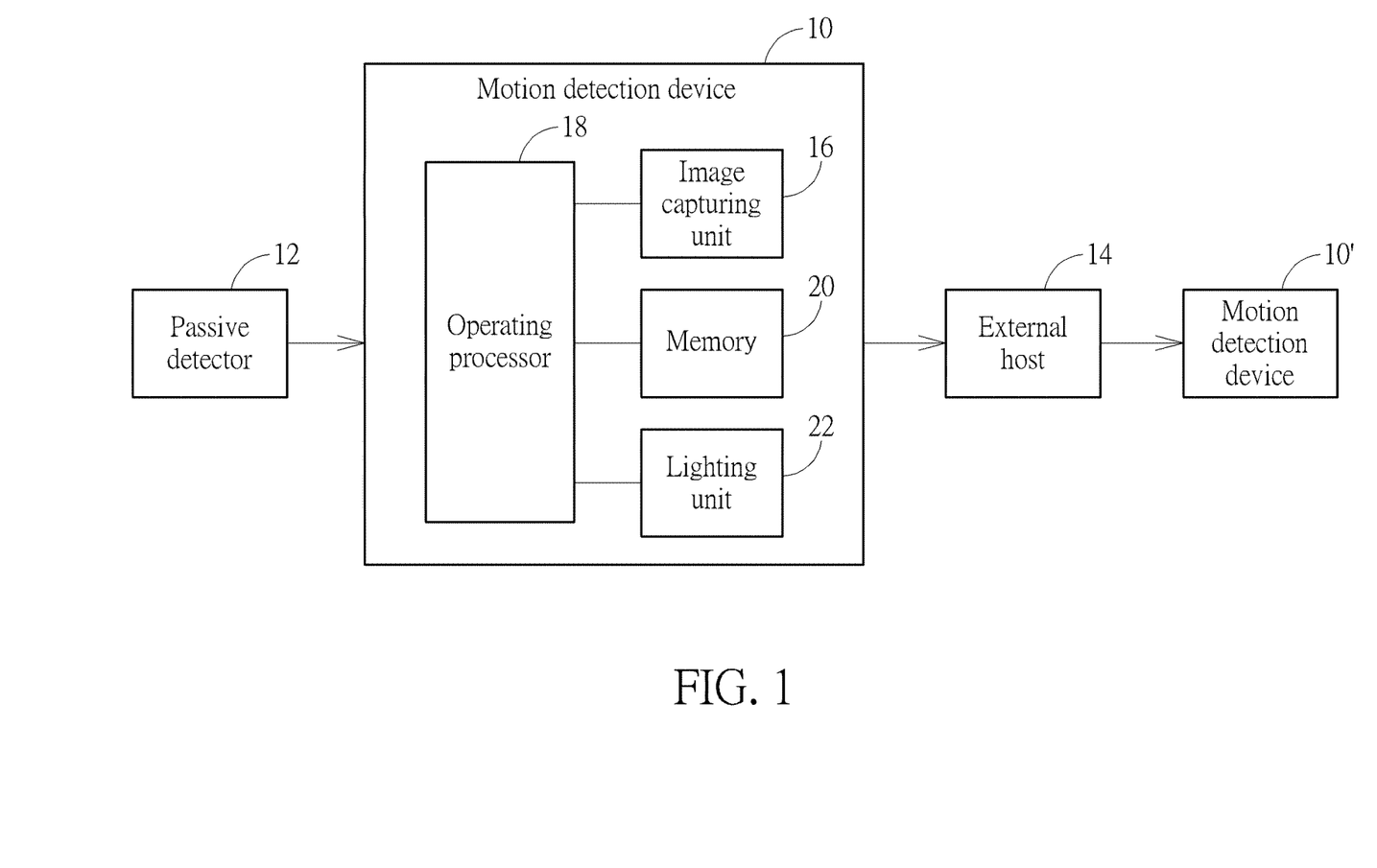
FIG. 1 is a block diagram of a motion detection device according to an embodiment of the present invention.

Please refer to FIG. 1. FIG. 1 is a block diagram of a motion detection device 10 according to an embodiment of the present invention. The motion detection device 10 can be matched with a passive detector 12 and an external host 14 to provide preferred smart motion detecting function. The motion detection device 10 is electrically connected between the passive detector 12 and the external host 14. The passive detector 12 is used to detect if a specific situation happened, such as a living thing passed by or a door opened, so as to trigger the motion detection device 10 to analyze if a true event of the specific situation existed, which means the living thing detected by the passive detector 12 is identified as an expected object. When the true event is determined, the motion detection device 10 transmits related data for the external host 14 to determine a security alarm.

In one embodiment, the passive detector 12 can be a temperature detector, such as an infrared detector, and the motion detection device 10 can be selectively operated in a sleep mode or a wakeup mode. While a monitoring region is in an usual state, the passive detector 12 does not detect temperature variation, the motion detection device 10 stays in a sleep mode; while in an unusual state that the specific situation happens (such like the living thing passed by), the passive detector 12 detects the temperature variation and generates a triggering signal to switch the motion detection device 10 from the sleep mode to a wakeup mode.

The motion detection device 10 can include an image capturing unit 16, an operating processor 18, a memory 20 and a lighting unit 22. The operating processor 18 can drive the image capturing unit 16 to alternatively switch between the sleep mode and the wakeup mode, and further can drive the image capturing unit 16 to optionally capture monitoring images with low quality and high quality. In one embodiment, the lighting unit 22 can be actuated only while the image capturing unit 16 captures image, so as to enhance the image capturing unit 16 capturing images in a power efficiency manner.

The image capturing unit 16 may capture a background monitoring image with a low frame rate in the sleep mode, and capture a plurality of monitoring images with a high frame rate in the wakeup mode. The background image could be captured in low quality, wherein the background image is used for auto-exposure control of the sensor capturing unit 16. The monitoring images could comprise a first monitoring image with the low quality and a second monitoring image with the high quality, wherein the first monitoring image is used for the processor 18 to identify if the true event is happened and the second monitoring image is used for the external host 14 to determine the security alarm. The monitoring images captured by the image capturing unit 16 can be stored inside the memory 20, and further the high quality monitoring image can be transmitted to the external host 14.

In this embodiment, the monitoring system utilizes the passive detector 12 to detect the object passing through the monitoring region for a start, and then utilizes the motion detection device 10 to analyze whether the passed object conforms to a predetermined condition (i.e., true event). As a view range of the passive detector 12 has passerby and the specific situation is identified, the motion detection device 10 is switched to the wakeup mode by the passive detector 12 and determines whether the passerby is the expected object (which means the human); if so, the motion detection device 10 actuates the external host 14, and the external host 14 identifies the object within the monitoring images to optionally drive the motion detection device 10 in a recording mode, to transmit monitoring video, to send out a warning, to shut down the motion detection device 10 and to awaken another motion detection device 10' electrically connected with the external host 14.

Figure 2:
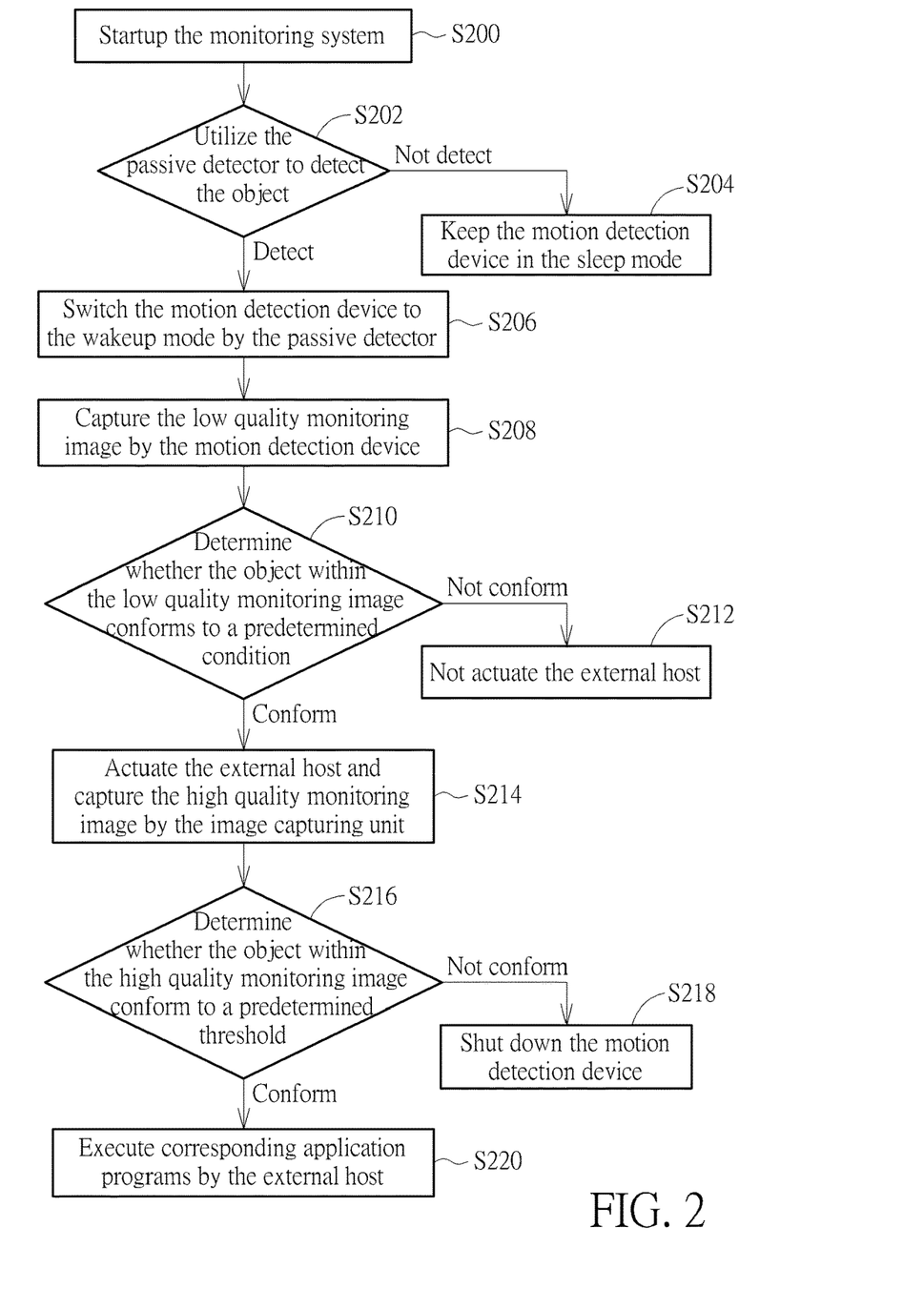
FIG. 2 is a flow chart of a motion detection method applied to the motion detection device according to the embodiment of the present invention.

Please refer to FIG. 2. FIG. 2 is a flow chart of a motion detection method applied to the motion detection device 10 according to the embodiment of the present invention. First, step S200 and S202 are executed to startup the monitoring system, and the passive detector 12 is utilized to detect the object within the view range. If the passive detector 12 does not detect the temperature variation, step S204 is executed to keep the image capturing unit 16 in the sleep mode; if the passive detector 12 detects the temperature variation, step S206 is executed that the passive detector 12 transmits the triggering signal to switch the image capturing unit 16 from the sleep mode to the wakeup mode. Then, step 208 and step 210 are executed, the lighting unit 22 can be actuated in accordance with surrounding illumination and the image capturing unit 16 captures the first monitoring image (with the low quality), the operating processor 18 simply analyzes the first monitoring image for determining whether to actuate the external host 14.

In one embodiment, the image capturing unit 16 captures the low quality monitoring image by using partial pixels, such as to divide the pixel array into a plurality of 2×2 pixel blocks and to use only one pixel in each pixel block to capture the image. In another embodiment, the image capturing unit 16 captures image by all pixels and divides all pixels to several pixel block (such as 2×2 pixel block) so as to combine values in all pixels in each pixel block as a block value and generates the low quality monitoring image by those block values.

In step S210, the operating processor 18 preferably analyzes a specific region of interest (ROI) within the first monitoring image to determine actuation of the external host 14, dimensions of the specific region is smaller than the first monitoring image, so that the operating processor 18 can rapidly acquire an image analysis result due to less data calculation in ROI; the first monitoring image setting as a low quality monitoring image is helpful to speed up image analysis about the specific region of interest. Position and dimensions of ROI are preferably pre-defined by the user, for example, a door and a window are situated in the first monitoring image, ROI can cover the pattern of the door to avoid the analysis result from being interfered by left shadow on the window, or ROI can cover edges of window for detecting a thief climbing into the window and also preventing the analysis result from being interfered by the left shadow; the position and dimensions of ROI further may be varied according to the analysis result. However, the operating processor 18 may analyze an entire region within the first monitoring image to perform the step 210, which depends on design demand. The said image analysis can be executed by identifying a pattern contour within the monitoring image, comparing feature point on the monitoring image, and analyzing intensity variation of the monitoring image optionally.

As the object does not conform to the predetermined condition, suck like the passerby within the monitoring image being the animal instead of the human, step S212 is executed to not actuate the external host 14, and the image capturing unit 16 may be passively or actively shut down to back the sleep mode. As the object conforms to the predetermined condition, which means the passerby within the monitoring image may be an unauthorized person, step S214 is executed to actuate the external host 14 and the image capturing unit 16 starts to capture the second monitoring image with the high quality, and the second monitoring image can be captured as static images format or a continuing video format and can be stored inside the memory 20. Next, step S216 is executed that the external host 14 receives the second monitoring image and utilizes image recognition algorithm to precisely analyze the object within the second monitoring image.

The second monitoring image does not conform to a predetermined threshold, which means the object is not the unauthorized person, step S218 is executed to shut down the motion detection device 10 passively or actively for energy economy; the second monitoring image conforms to the predetermined threshold, hence the object is defined as the unauthorized person, step S220 is executed that the external host 14 can switch the motion detection device 10 into the recording mode, the motion detection device 10 transmits the monitoring video outwardly for backup, and the other motion detection devices 10' can be simultaneously awaken for overall monitoring. Therefore, the passive detector 12 cannot directly actuate the external host 14 while detecting the object, the motion detection device 10 wakes up by trigger of the passive detector 12 to capture the first monitoring image, and the external host 14 is actuated in accordance with the low quality image analysis of the first monitoring image through the motion detection device 10.

The motion detection device 10 can begin to capture the second monitoring image while the external host 14 is actuated. The external host 14 has to spend a period of time on waking other motion detection devices, the second monitoring image can record any doubtful event inside the monitoring region before the other motion detection devices are awaken, which means the monitoring system does not miss the doubtful event in a term between a detection timing of the passive detector 12 and a wakeup timing of the other motion detection devices. The first monitoring image with the low quality is used by the motion detection device 10 to determine existence of the object, the existence determination is rough computation and may be affected by noise, and the second monitoring image with the high quality is used by the external host 14 to analyze the accurate motion detection of the object, such as face recognition.

Figure 3:
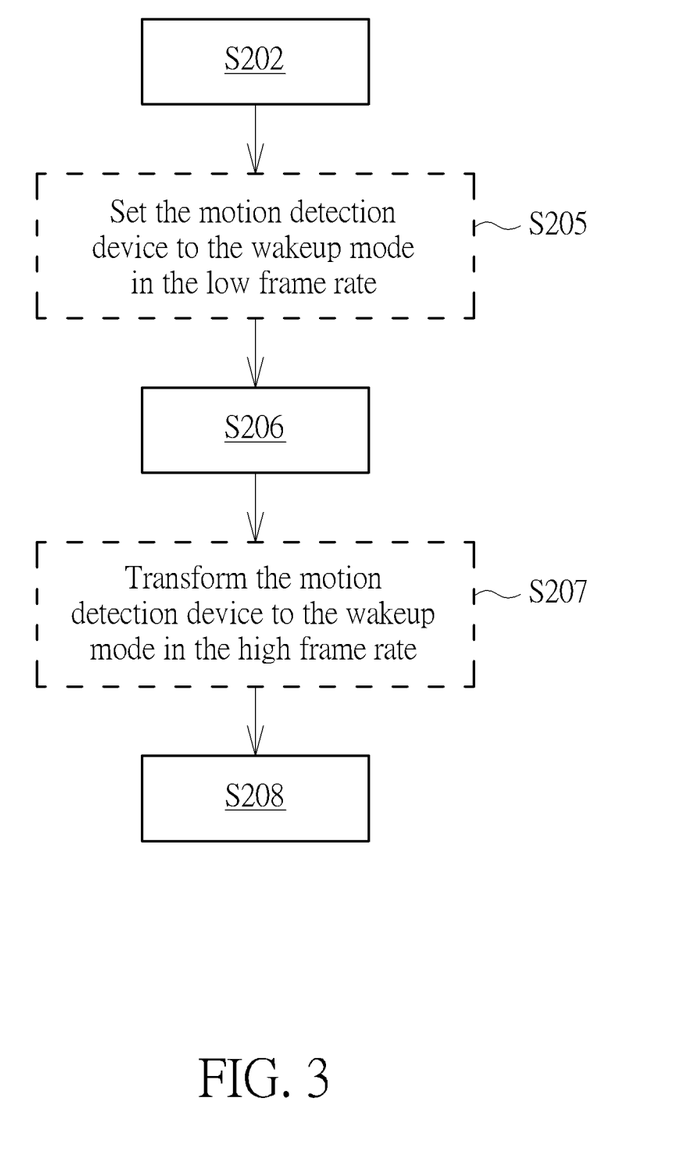
FIG. 3 is a flow chart of a motion detection method applied to the motion detection device according to the embodiment of the present invention.
Figure 4:
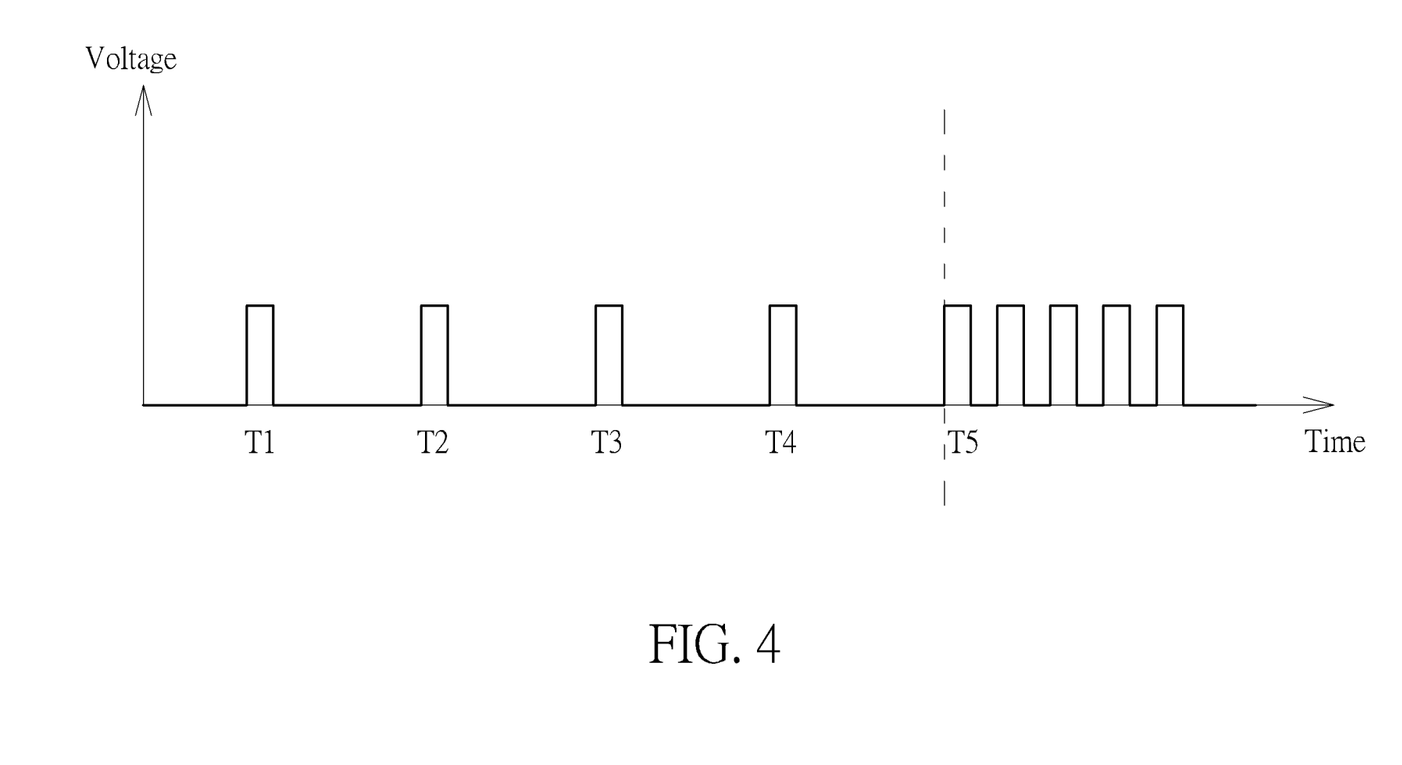
FIG. 4 is a waveform diagram of a frame rate executed by an image capturing unit according to the embodiment of the present invention.

The present invention further provides an exposure adjustment function for preferred operational efficiency of the motion detection device 10. Please refer to FIG. 3 and FIG. 4. FIG. 3 is a flow chart of a motion detection method applied to the motion detection device 10 according to another embodiment of the present invention. FIG. 4 is a waveform diagram of a frame rate executed by the image capturing unit 16 according to the foresaid embodiment of the present invention. In the embodiment, steps having the same numeral as one of the above-mentioned embodiment have the same content, and a detailed description is omitted herein for simplicity. As the motion detection device 10 is not awaken by the passive detector 12, step S205 can be executed to periodically switch the image capturing unit 16 to the wakeup mode in the low frame rate, and the image capturing unit 16 in the wakeup mode can execute the exposure adjustment and capture a low quality background image. As the motion detection device 10 is awaken, step S207 is executed to transform the image capturing unit 16 into the wakeup mode in the high frame rate, and later, the image capturing unit 16 still captures the monitoring image with the low quality to compare with the background image for determining actuation of the external host 14.

For example, as shown in FIG. 4, the image capturing unit 16 may execute the exposure adjustment and capture the background image one frame per second (1 fps) while the motion detection device 10 is not triggered by the passive detector 12, which means an exposure parameter of the image capturing unit 16 can be adjusted and the background image can be established at timing T1, T2, T3 and T4. While the passive detector 12 triggers the motion detection device 10 into the wakeup mode at timing T5, the motion detection device 10 may capture the first monitoring images thirty frames per second (30 fps), the latest background image (captured at the timing T4) has the exposure parameter similar to ones of the first monitoring image captured at the timing T5, so that the image capturing unit 16 in the wakeup mode is not in need of the exposure adjustment, and can immediately acquire the superior monitoring image with suitable exposure parameters.

In conclusion, the motion detection device of the present invention is electrically connected between the passive detector and the external host, and the motion detection device is utilized to actuate the external host while the passive detector triggers the motion detection device switched from the sleep mode to the wakeup mode. As the motion detection device is in the sleep mode, the motion detection device can be awaken in the low frame rate or stay in the sleep mode to adjust the exposure parameter and to capture the background image; as the motion detection device is switched to the wakeup mode, the motion detection device is transformed into the high frame rate to capture the low quality monitoring image. The motion detection device executes the simple image analysis via ROI of the low quality monitoring image for a start for determining whether to actuate the external host; since the motion detection device actuates the external host, the motion detection device captures and stores the high quality monitoring image, and the high quality monitoring image can be used by the external host for the accurate image analysis and execution of related application programs. The motion detection device of the present invention can effectively economize start-up time of the monitoring system without waiting for a wakeup period of the external host and an exposure adjustment period of the motion detection device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A motion detection device, matched with a passive detector utilized to detect an object and to accordingly generate a triggering signal, the motion detection device comprising:

an image capturing unit; and an operating processor electrically connected with the image capturing unit, the operating processor being adapted to switch the image capturing unit from a sleep mode to a wakeup mode for motion detection while being triggered by the triggering signal, and further to optionally actuate an external host in accordance with an analysis result of the motion detection;

wherein the image capturing unit is switched to the wakeup mode in a low frame rate while the motion detection device is not triggered by the triggering signal, and is further switched to the wakeup mode in a high frame rate while the motion detection device is triggered by the triggering signal.

2. The motion detection device of claim 1, wherein the image capturing unit is driven to capture a first monitoring image with low quality before the external host is actuated, and the image capturing unit is further driven to capture a second monitoring image with high quality while the operating processor actuates the external host.

3. The motion detection device of claim 2, wherein the operating processor analyzes the first monitoring image for determining whether to actuate the external host.

4. The motion detection device of claim 3, wherein the operating processor analyzes a region of interest within the first monitoring image to determine actuation of the external host.

5. The motion detection device of claim 2, wherein the first monitoring image is analyzed to determine existence of the object, and the second monitoring image is used to analyze the motion detection of the object.

6. The motion detection device of claim 2, wherein the motion detection device further comprises a memory electrically with the operating processor and adapted to store the second monitoring image, the second monitoring image is transmitted to the external host for the motion detection.

7. The motion detection device of claim 6, wherein the operating processor utilizes the external host to awaken another motion detection device in accordance with an analysis result of the second monitoring image by the external host.

8. The motion detection device of claim 2, wherein the operating processor shuts down the image capturing unit while the external host determines that the second monitoring image does not conform to a predetermined threshold.

9. The motion detection device of claim 1, wherein the motion detection device further comprises a lighting unit electrically connected with the operating processor, and the lighting unit is actuated by the operating processor while the image capturing unit is switched to the wakeup mode.

10. The motion detection device of claim 1, wherein the operating processor drives the image capturing unit to execute exposure adjustment while the image capturing unit is switched to the wakeup mode in the low frame rate.

11. The motion detection device of claim 1, wherein the image capturing unit is driven to capture a background image in the low frame rate, and the background image is compared with a monitoring image captured in the high frame rate to determine actuation of the external host.

12. The motion detection device of claim 11, wherein the background image is a low quality image.

13. A motion detection method applied to the motion detection device matched with a passive detector utilized to detect an object and to accordingly generate a triggering signal, the motion detection method comprising:
    switching an image capturing unit from a sleep mode to a wakeup mode in a low frame rate for capturing a background image;
    receiving the triggering signal;
    switching the image capturing unit from the sleep mode to the wakeup mode in a high frame rate for capturing a first monitoring image with low quality via the triggering signal;
    analyzing the first monitoring image by comparing the background image with the first monitoring image to determine existence of the object; and
    actuating an external host in accordance with an analysis result of the first monitoring image.

14. The motion detection method of claim 13, further comprising:
    driving the image capturing unit to capture a second monitoring image with high quality while actuating the external host.

15. The motion detection method of claim 14, further comprising:
    storing the second monitoring image in a memory; and
    transmitting the second monitoring image to the external host in accordance with request from the external host.

16. The motion detection method of claim 14, further comprising:
    shutting down the image capturing unit automatically or by an external command in accordance with analysis of the second monitoring image.

17. The motion detection method of claim 14, wherein the first monitoring image is analyzed to determine actuation of the external host, and the second monitoring image is analyzed by the external host for motion detection.

18. The motion detection method of claim 13, further comprising:
    actuating a lighting unit while the image capturing unit is switched to the wakeup mode.

19. The motion detection method of claim 13, further comprising:
    driving the image capturing unit to execute exposure adjustment while the image capturing unit is switched to the wakeup mode in the low frame rate.

20. The motion detection method of claim 13, wherein the background image is a low quality image.

21. A motion detection device, matched with a passive detector utilized to detect an object and to accordingly generate a triggering signal, the motion detection device comprising:
    an image capturing unit; and
    an operating processor electrically connected with the image capturing unit, the operating processor being adapted to switch the image capturing unit from a sleep mode to a wakeup mode for motion detection while being triggered by the triggering signal, and further to optionally actuate an external host in accordance with an analysis result of the motion detection;
    wherein the image capturing unit is driven to capture a first monitoring image with low quality before the external host is actuated, the image capturing unit is further driven to capture a second monitoring image with high quality while the operating processor actuates the external host, the first monitoring image is analyzed to determine existence of the object, and the second monitoring image is used to analyze the motion detection of the object.

22. A motion detection device, matched with a passive detector utilized to detect an object and to accordingly generate a triggering signal, the motion detection device comprising:
    an image capturing unit; and
    an operating processor electrically connected with the image capturing unit, the operating processor being adapted to switch the image capturing unit from a sleep mode to a wakeup mode for motion detection while being triggered by the triggering signal, and further to optionally actuate an external host in accordance with an analysis result of the motion detection;
    wherein the image capturing unit is driven to capture a first monitoring image with low quality before the external host is actuated, and the image capturing unit is further driven to capture a second monitoring image with high quality while the operating processor actuates the external host;

wherein the motion detection device further comprises a memory electrically with the operating processor and adapted to store the second monitoring image, the second monitoring image is transmitted to the external host for the motion detection, and the operating processor utilizes the external host to awaken another motion detection device in accordance with an analysis result of the second monitoring image by the external host.

* * * * *